US008320580B2

(12) United States Patent
Kadar

(10) Patent No.: US 8,320,580 B2
(45) Date of Patent: Nov. 27, 2012

(54) SYSTEM AND METHOD FOR DIRECTIONAL SOUND TRANSMISSION WITH A LINEAR ARRAY OF EXPONENTIALLY SPACED LOUDSPEAKERS

(75) Inventor: Istvan B Kadar, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1300 days.

(21) Appl. No.: 12/044,249

(22) Filed: Mar. 7, 2008

(65) Prior Publication Data

US 2009/0226000 A1 Sep. 10, 2009

(51) Int. Cl.
*H04B 3/00* (2006.01)

(52) U.S. Cl. .............. 381/80; 381/77; 381/82; 381/120; 381/387

(58) Field of Classification Search .................... 381/77, 381/80, 82, 117, 83, 335, 120, 28, 387
See application file for complete search history.

(56) References Cited

U.S. PATENT DOCUMENTS 4,421,957 A 12/1983 Wallace, Jr.
5,073,945 A * 12/1991 Kageyama et al. ............. 381/89
6,128,395 A * 10/2000 De Vries ........................ 381/387
7,260,235 B1 * 8/2007 Henricksen et al. .......... 381/335
8,073,156 B2 * 12/2011 Hutt et al. ........................ 381/86
2002/0072816 A1 * 6/2002 Shdema et al. ................. 700/94
2006/0204022 A1 9/2006 Hooley et al.
2006/0269080 A1 11/2006 Oxford et al.
2007/0110268 A1 * 5/2007 Konagai et al. ............... 381/335
2007/0165878 A1 * 7/2007 Konagai .......................... 381/89

OTHER PUBLICATIONS

Harry F. Olson, "Acoustical Engineering", D. Van Nostrand Company, Inc. p. 45,46.
Jefferson A. Harrell, "Constant-Beamwidth One-Octave Bandwidth End-Fire Line Array of Loudspeakers", J. Audio Engineering Society, vol. 43, No. 7-8 Jul./Aug. 1995
Johan van der Werff, "Design and Implementation of a Sound Column with Exceptional Properties", Audio Engineering Society Preprint 96th Convention, Feb. 26-Mar. 1, 1994.

* cited by examiner

*Primary Examiner* — Disler Paul
(74) *Attorney, Agent, or Firm* — Farjami & Farjami LLP

(57) ABSTRACT

A system and method for the directional transmission of sound is disclosed. In one embodiment, the system comprises an audio source configured to generate an audio signal, a control module configured to receive the audio signal and generate a driving signal, based at least in part on the audio signal, and an array comprising a plurality of loudspeakers, wherein the loudspeakers are linearly arranged such that the spacing between two adjacent loudspeakers increases along the array. In a particularly, embodiment, the spacing increases exponentially, and broadband dipole loudspeakers are used.

32 Claims, 3 Drawing Sheets

SYSTEM AND METHOD FOR DIRECTIONAL SOUND TRANSMISSION WITH A LINEAR ARRAY OF EXPONENTIALLY SPACED LOUDSPEAKERS

BACKGROUND OF THE INVENTION

1. Field of the Invention

The present invention relates to the directional transmission of sound, and more particularly to the directional transmission of sound using an array of transducers.

2. Description of the Related Technology

The ability to focus sound, that is to have the strength of sound be stronger in a certain region with respect to all other regions, has many uses. Mechanisms exist today for producing a directional or localized sound.

Transducers, in general, are devices which convert one kind of energy into another kind of energy. An example is a microphone, which converts an acoustic wave (changes in air pressure) into an electrical signal. The converse, which converts an electrical signal into an acoustic wave, is called a loudspeaker. Loudspeakers can be characterized by the band of acoustic frequencies they can faithfully reproduce, i.e. reproduce at a sufficient volume with minimal distortion. The range of frequencies audible to the average person has been estimated between 20 Hz and 20 kHz. Broadband loudspeakers attempt to faithfully reproduce all of these frequencies, but, practical broadband loudspeakers generally faithfully reproduce frequencies between 100 Hz and 10 kHz.

In addition to producing different frequencies, some loudspeakers are designed to transmit sound directionally. One type of directional loudspeaker is one which uses a dipole source, in which sound in transmitted in two directions, forwards and backwards. This is in contrast to an omni-directional source, which produces sound in all directions. Structure may also be used to affect the direction of sound transmission. For example, loudspeakers with spherical, parabolic, or elliptical reflectors are known to form directional sounds beams. The reflector, which may be placed behind the loudspeaker, causes sound to be transmitted forward to propagate unimpeded, and causes sound propagating backward to be reflected forward by the reflector. However, reflector-based directional speakers are limited in their low frequency response by the diameter of the reflector. Shadowing of the reflector by the source loudspeaker also interferes with the directionality, that is, as sound is reflected off the reflector forward, it may be impeded by the source. Horns with an exponential or conical cross-section can also be used to form directional sound beams. However, as the directionality of horn loudspeakers is determined by the dimensions of the mouth of the horn and internal contour, they must be very large to achieve high directionality. Another method of creating a directional beam of sound is to use a parametric array, which takes advantage of the non-linearity of air at high sound pressures to demodulate and amplitude modulated ultrasonic carrier. This requires that the speaker generate a relatively high intensity, typically greater than 130 dBspl in the 40-70 kHz range, which may be unfavorable or unsafe for producing audio for a human listener.

SUMMARY OF CERTAIN INVENTIVE ASPECTS

One aspect of the invention is a system for the directional transmission of sound, the system comprising an audio source configured to generate an audio signal, a control module configured to receive the audio signal and generate a driving signal, based at least in part on the audio signal, and an line array comprising a plurality of directional loudspeakers, wherein, in response to the driving signal, each loudspeaker is configured to produce sound primarily in the direction of the line array, and wherein the loudspeakers are arranged such that the spacing between two adjacent loudspeakers increases along the line array.

Another aspect of the invention is a method of directionally transmitting sound, the method comprising generating an audio signal, and providing a driving signal to each of plurality of loudspeakers, based at least in part on the audio signal, wherein the driving signal provided to each of plurality of loudspeakers differs by an exponentially increasing time-delay.

Yet another aspect of the invention is one or more processor-readable storage devices have processor-readable code, the processor-readable code for programming one or more processors to perform a method of directionally transmitting sound, the method comprising generating an audio signal, and providing a driving signal to each of plurality of loudspeakers, based at least in part on the audio signal, wherein the driving signal provided to each of plurality of loudspeakers differs by an exponentially increasing time-delay.

Still another aspect of the invention is a system for the directional transmission of sound, the system comprising means for generating an audio signal, and means for providing a driving signal to each of plurality of loudspeakers, based at least in part on the audio signal, wherein the driving signal provided to each of plurality of loudspeakers differs by an exponentially increasing time-delay.

DETAILED DESCRIPTION OF CERTAIN INVENTIVE EMBODIMENTS

Figure 1:
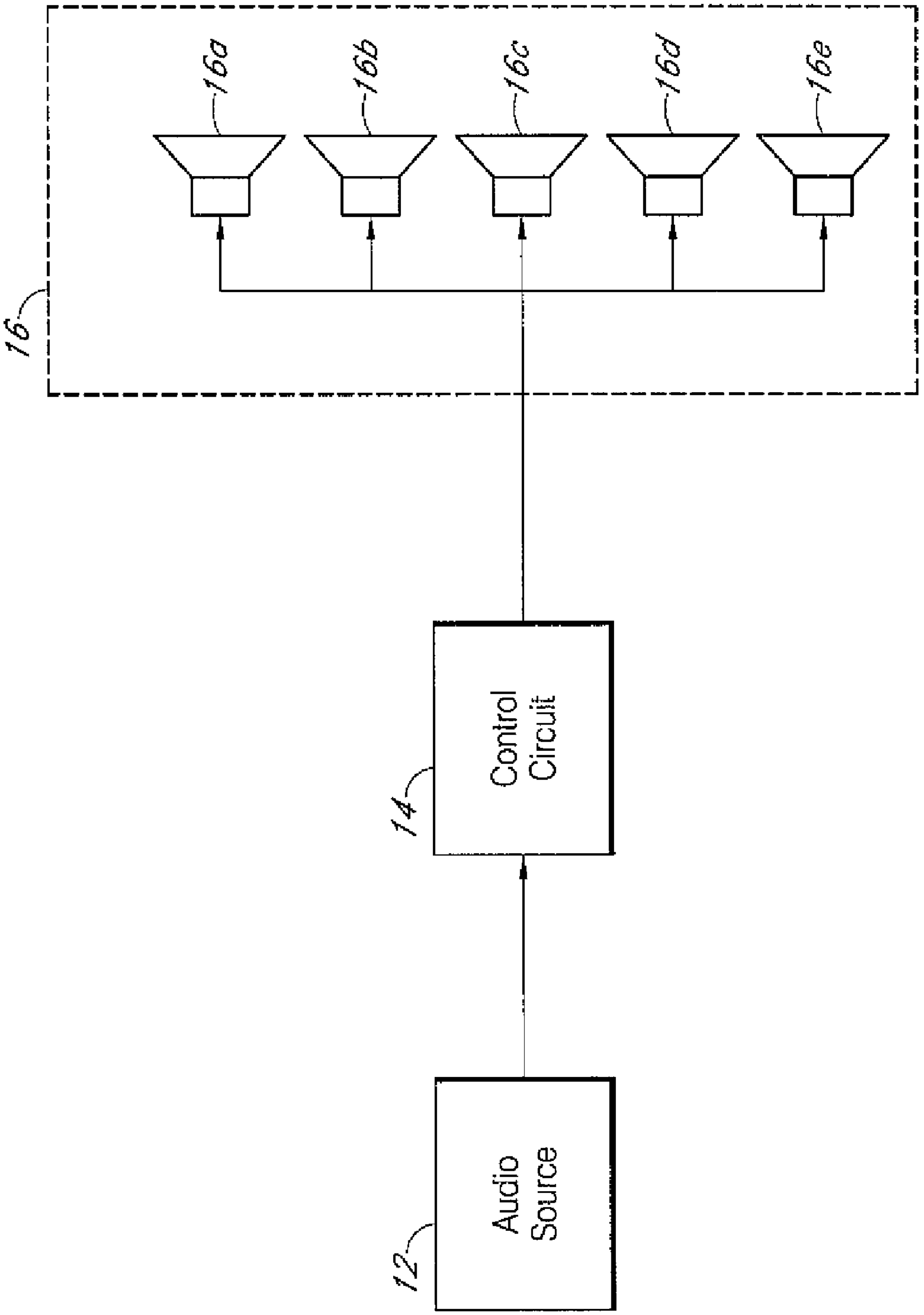
FIG. 1 is a functional block diagram of an exemplary embodiment of the invention.

When sound is transmitted from multiple sources, the received sound is approximately the sum of the sounds that would be received from each source, if only that source was transmitting. This is known as the principle of superposition. At any particular frequency, the sounds transmitted from multiple sources will interfere, either constructively or destructively. If the sounds interfere constructively, the received sound, equal to the sum of the sounds produced by each source, will be louder, and if the sounds interfere destructively, the received sound will be quieter.

Whether the sounds from the plurality of sources interfere constructively or destructively at a particular frequency depends on the sounds produced and the point in space (relative to the location of the source) at which they are received. By specifying the sounds produced at each source, it is possible to focus sound, such that the sounds interfere constructively across a wide band of frequencies at a particular point (or area) and interfere destructively elsewhere.

One such method of focusing sound, termed time-delay beamforming, is to send the same sound from multiple sources, but wherein the sound emitted by each of the sources is transmitted at slightly different times. The received sound at a point in space is approximately the sound emitted from any one source, but either loud or quiet depending on where the receiver is. Often, when time-delay beamforming is performed, the area at which the sounds emitted from the sources interfere constructively forms a "beam" from the array pointing in a particular direction.

When the sources used in beamforming, termed an array of sources, are linearly arranged, such that each source position is collinear, the array is called a line array. This simplifies the mathematics of calculating the appropriate time delays for each of the sources. The direction in which the line array points is termed the endfire direction. Perpendicular to this direction is termed the broadside direction. By attempting to focus sound in the endfire direction with a line array, the mathematics of calculating the appropriate time delays for each of the sources is further simplified.

In one embodiment of the invention, a line array is used to focus sound in the endfire direction. The sound is transmitted from a first loudspeaker at a first time. Slightly later, after the sound has propagated the distance from the first loudspeaker to a second loudspeaker, the second loudspeaker transmits the same sound. Slightly later still, after the sounds from the first loudspeaker and the second loudspeaker have propagated the distance to a third loudspeaker, the third loudspeaker transmits the same sound. This process is repeated along the array. The effect of this transmission is that the sound interferes constructively at points in the endfire direction, but destructively in other directions. By using loudspeakers with directional characteristics, such as dipole loudspeakers, the directionality of the array can be enhanced further.

In most line arrays, the spacing between any two adjacent elements is the same. However, improved directionality across a wide band of frequencies can be achieved by using an unequal spacing. In one embodiment of the invention, a line array is used to directionally transmit sound, wherein the spacing between any two adjacent elements increases along the array. In a particular embodiment, the spacing increases exponentially along the array. It should be understood that the use of such a designed line array can effectively focus sound in any direction, both endfire in the direction of increase, endfire in the opposite direction, broadside, or at any other angle.

The use of highly directional sound transmission can be used to deliver localized speech, sound effects, or music for theme park rides, queues, and performance areas. The localization can effectively deliver sound to a few guests at a time to surprise or startle them. The localization can also be used to deliver audio without intruding on adjacent scenes or performance areas.

FIG. 1 is a functional block diagram of an exemplary embodiment of the invention. The system comprises an audio source 12, a control circuit 14, and a line array 16, wherein the line array 16 comprises a plurality of loudspeakers 16*a-e*. The audio source 12 may be, for example, a microphone or a digital audio signal stored in a memory. The audio source 12 may also be an audio signal from another sound storage device, such as a compact disc, cassette tape, MP3 player, etc. The audio source 12 feeds an audio signal to the control circuit 14 for processing. The control circuit 14 is responsible for providing the appropriate driving signal for each of the plurality of loudspeakers of the array 16. The control circuit 14 may be a simple electronic delay line that delays the output of each loudspeaker to coincide with the time of the arrival of sound at that loudspeaker with sound from the loudspeakers from which sound was previously transmitted. The control circuit 14 may additionally provide filtering or other, more complicated audio effects to the received audio signal. The control circuit 14 may also include appropriate amplification circuitry for amplifying the driving signal to each of the plurality of loudspeakers of the array. The array 16 may be comprised of any finite number of loudspeakers. In one embodiment, the array 16 is a line array with exponentially-spaced elements. In another embodiment, the array elements are spaced using another function. Each loudspeaker 16*a-e* may be may be traditional moving coil loudspeakers or planar devices. The radiation pattern of each loudspeaker may advantageously be a dipole radiation pattern, however it may also be omni-directional or of some other shape.

Figure 2:
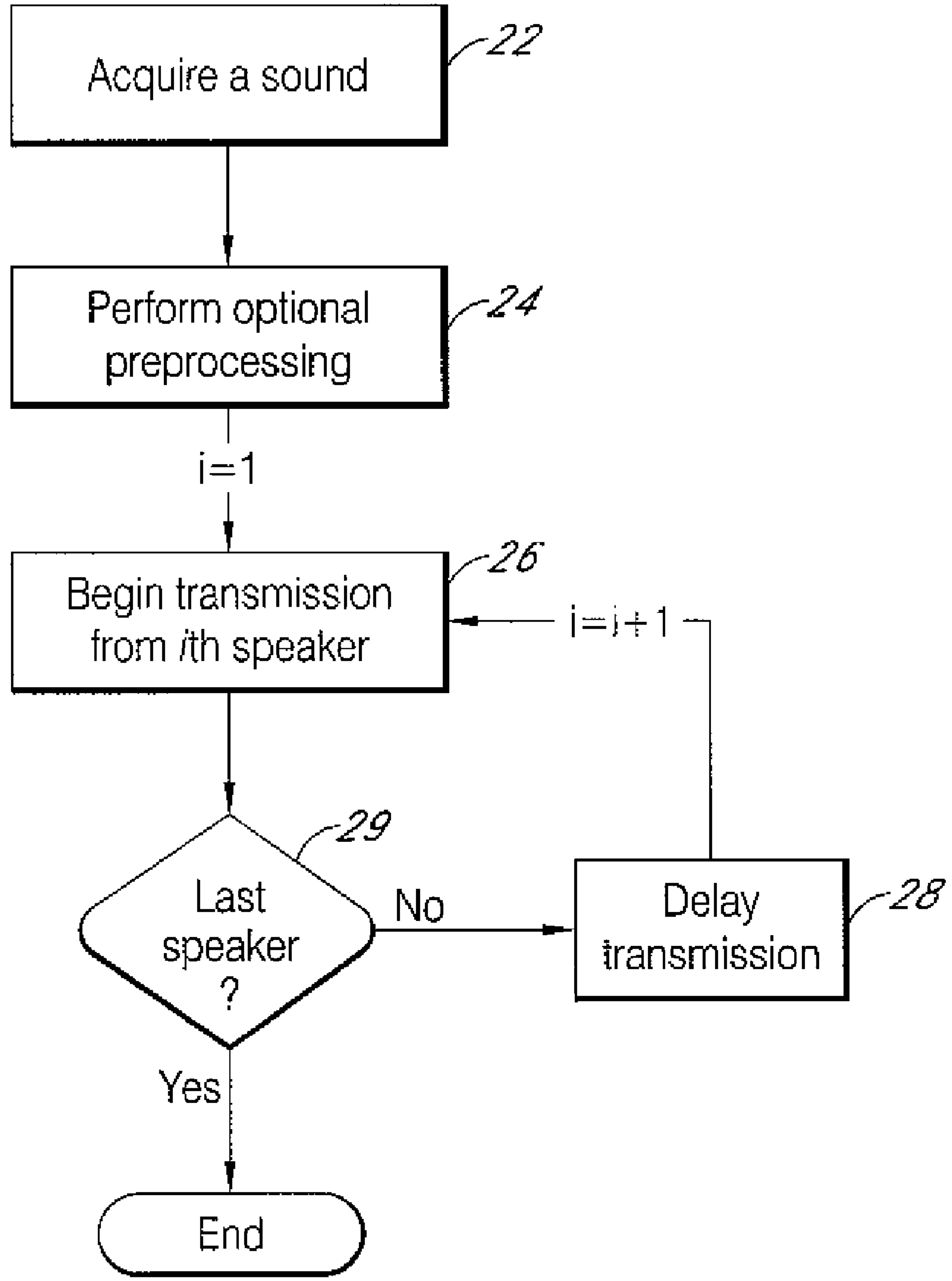
FIG. 2 is a flowchart which shows a method of producing a focused sound.

FIG. 2 is a flowchart which shows a method of producing a focused sound. In the first stage, a sound is acquired 22. The sound may be subjected to audio pre-processing 24, such as filtering, amplification, noise reduction, or the addition of audio effects, such as echo or reverb. When the signal to be transmitted is prepared, transmission begins from the first loudspeaker 26. After waiting a specific time 28, calculable from the speed of sound (approximately 300 m/s in air), the distance between the first and second speaker, and the direction in which focused sound is desired, transmission begins from the second speaker. After waiting again, the amount of time calculable as before, using the distance between the second and third speakers, transmission begins from the third speaker. This process repeats until all speakers have begun to transmit sound 29. After the last speaker begins transmitting sound, the process ends.

Figure 3:
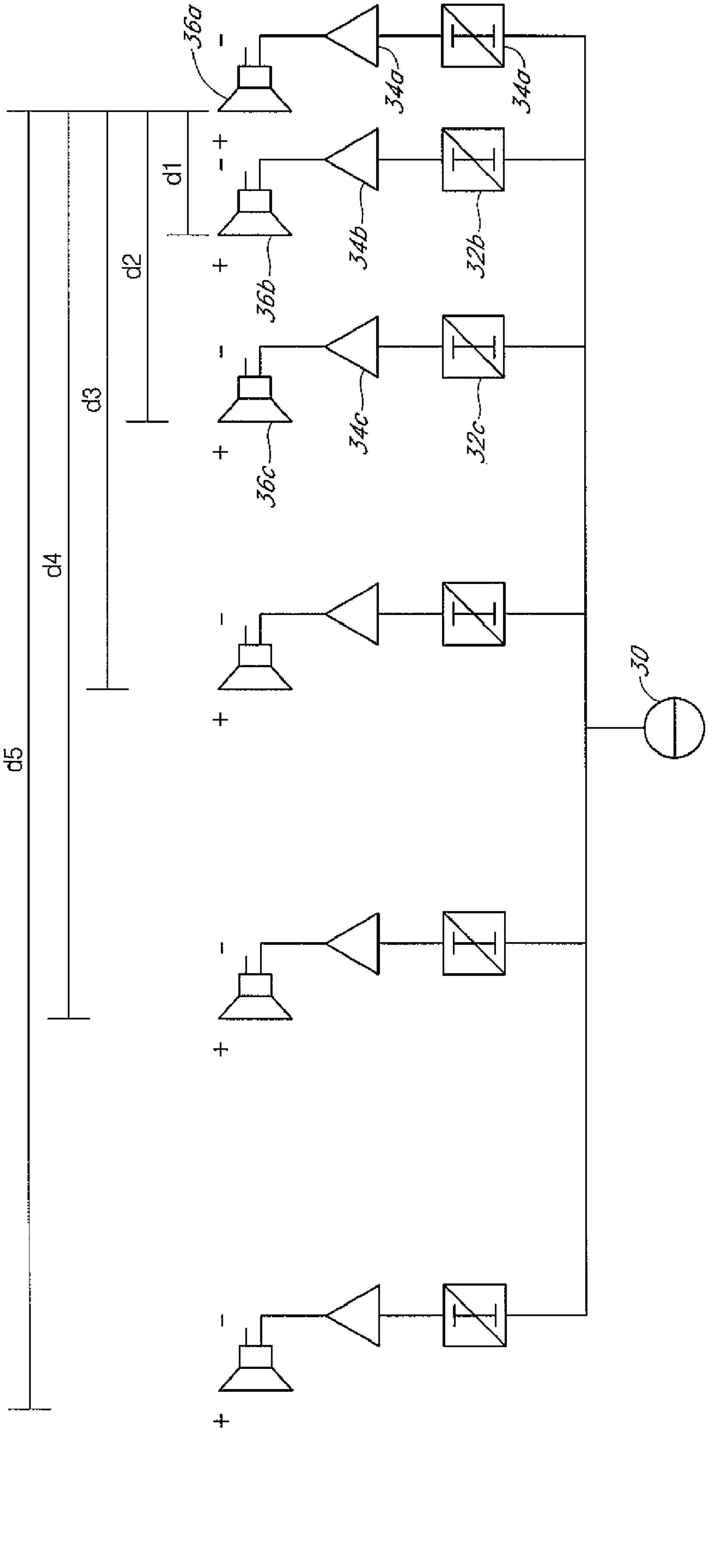
FIG. 3 is another exemplary embodiment of the invention, wherein the array elements are exponentially spaced.

FIG. 3 is another exemplary embodiment of the invention, wherein the array elements are exponentially spaced, that is the distances d1, d2, d3, etc. increase exponentially along the array. This embodiment comprises a source 30, delay filters 32*a*, 32*b*, 32*c*, power amplifiers 34*a*, 34*b*, 34*c*, and loudspeakers 36*a*, 36*b*, 36*c*. In this embodiment of the invention, the filters 32 are designed to cause the input signal to be delayed by the amount of time it takes sound to travel the distance from the first speaker to the speaker to which the filter is connected. The filters 32 may also be designed with other features, such as to enhance frequency characteristics of the sound, reduce noise, or otherwise add audio effects, such as echo or reverb. The filters 32 may also be designed to restrict the bandwidth of the signal to correspond to the useful operating range of the loudspeaker. In this embodiment, each loudspeaker 36 is connected to the filter 32 via a power amplifier 34. Filtering may be performed in the digital or analog domain. The filters 32 may be embodied as hardware, software, firmware, or a combination thereof. In other embodiments, one power amplifier may be used prior to filtering, or more than one power amplifier for each speaker may be employed. Although the figure shows six elements of the array, it is to be understood that any number of elements can be used.

As mentioned, in some embodiments of the invention, the loudspeaker spacing of a line array is exponential. This can be written mathematically, where $d_n$ is the distance from the first speaker as:

$$d_n = AB^{Cn} + D,$$

where A, B, C, and D are constants. In some embodiments, C is a positive number, meaning the spacing increases along the array, wherein in alternative embodiments, C is a negative number. Other functions can be used to determine the spacing. As an alternative embodiment, the loudspeakers are spaced using a recurrence relation, such that, $d_n$ depends on $d_{n-1}$, $d_{n-2}$, $d_{n-3}$, etc. Some recurrence relations can be written as:

$$d_n = \left( \sum_{i=0}^{\infty} n^i A_i B_i^n \right) + D$$

where $A_i$, $B_i$, and D are constants. One example of this is to set the distance between the loudspeakers to be proportional to Fibonacci's sequence. These two equations can be generalized for another rule to be applied to loudspeaker spacing as:

$$d_n = \left(\sum_{i=0}^{\infty} n^i A_i B_i^{C_i n}\right) + D$$

where $A_i$, $B_i$, $C_i$, and D are constants. The above rules applied to the distance from the first speaker can also be applied to the spacing between adjacent speakers.

Although, an endfire line array with unequal spacing has good focusing properties in the endfire direction across a wide band of frequencies, the same array may still be used to focus in other directions, by appropriate delaying the transmission from each speaker. Since the performance is better in directions close to endfire, the array may be advantageously used to focus in a number of directions close to endfire to effectively deliver sound to a few guests at a time to surprise or startle them.

In one embodiment of the invention, the array is comprised of twelve unbaffled planar diaphragm transducers, such as model M600 made by Sonigistix Inc., exponentially spaced co-linearly around an 8 ft. metal rod. In one embodiment of the invention, audio power amplification is achieved through the use of two six-channel amplifiers, such as model CP600 made by Crown International Inc. In one embodiment of the invention, digital signal processing for delay and equalization is done using various hardware and software tools, such as the MediaMatrix system made by Peavey Electronics.

As mentioned above, one embodiment of the invention is implemented using simple delays. These delays can be calculated using a number of methods. For example, the spacing between the speakers can be explicitly measured and input into the digital signal processing. The distances could be divided by the speed of sound to produce the appropriate delays. In other embodiments, the delays could be calculated one speaker at a time by measuring the amount of time required for a sound, such as a maximum-length sequence (MLS) to propagate from the speaker to a distant microphone. The delays could also be explicitly calculated on more than one speaker simultaneously. One method of accomplishing this involves the transmission of a different sound from each speaker at the same time. In some embodiments, the set of sounds transmitted constitutes a set of orthogonal functions that can be easily separated by a single distant microphone. Such a distant microphone could, in some embodiments, be placed along the endfire direction of the array.

In one embodiment of the invention, the sound file to be played is read from a memory in a pulse-code modulated (PCM) format. In other embodiments, the sound file may be decoded before input to a digital-to-analog converter. In one embodiment, sound files corresponding to each of the loudspeakers are created in memory by introducing the appropriate delay. One method of introducing this delay would be to add a long string of zeros to the beginning of the PCM file. Each of these files may be loaded into different channel of a sound card and all files begin playing simultaneously. In another embodiment, only one sound file is created, but it is read from the memory at different times corresponding to the appropriate delay. The sound file may be stored in a block format to facilitate the reading of different portions of the sound file at different times. This embodiment, or other embodiments, may be facilitated through the use an external control, such as the MediaMatrix Audio Break-Out Box (BOB) produced by Peavey Electronics.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A system for the directional transmission of sound, the system comprising:

an audio source configured to generate an audio signal;

a control module configured to receive the audio signal and generate a driving signal, based at least in part on the audio signal; and a line array comprising a plurality of directional loudspeakers, wherein, in response to the driving signal, each loudspeaker is configured to produce sound primarily in the direction of the line array, and wherein the loudspeakers are arranged such that the spacing between two adjacent loudspeakers increases along the line array;

wherein the driving signal provided to each of the plurality of directional loudspeakers is derived from different digital audio files stored in a memory.

2. The system of claim 1, wherein the loudspeakers are arranged such that the spacing between any pair of loudspeakers differs from the spacing between a different pair of loudspeakers.

3. The system of claim 1; wherein the loudspeakers comprise dipole transmitters.

4. The system of claim 1, wherein the loudspeakers are arranged such that the spacing between the two adjacent loudspeakers increases exponentially along the line array.

5. The system of claim 1, wherein the driving signal for each loudspeaker differs by a time-delay.

6. The system of claim 5, wherein the time-delay for a given loudspeaker is the distance between a first loudspeaker and the given loudspeaker divided by the speed of sound.

7. The system of claim 1, wherein the loudspeakers are broadband loudspeakers.

8. The system of claim 7, wherein the loudspeakers faithfully reproduce frequencies between 100 Hz and 10 kHz.

9. The system of claim 1, wherein the audio source comprises a microphone.

10. The system of claim 1, wherein the audio source comprises a storage configured to store a digital audio file.

11. A method of directionally transmitting sound, the method comprising:

generating an audio signal; and providing a driving signal to each of plurality of loudspeakers, based at least in part on the audio signal, wherein the driving signal provided to each of plurality of loudspeakers differs by an exponentially increasing time-delay;

wherein the driving signal provided to each of the plurality of loudspeakers is derived from different digital audio files stored in a memory.

12. The method of claim 11, wherein providing a driving signal comprises audio preprocessing of the, audio signal.

13. The method of claim 12, wherein the audio preprocessing comprises filtering.

14. The method of claim 13, wherein the filtering comprises filtering the audio signal to have a bandwidth substantially similar to that of an operating range of the loudspeaker.

15. The method of claim 12, wherein the audio preprocessing comprises the addition of at least one of echo and reverb.

16. The method of claim 11, wherein the driving signal provided to each of the plurality of loudspeakers is derived from a single digital audio file stored in a memory.

17. One or more processor-readable storage devices have processor-readable code, the processor-readable code for programming one or more processors to perform a method of directionally transmitting sound, the method comprising:

generating an audio signal; and providing a driving signal to each of plurality of loudspeakers, based at least in part on the audio signal, wherein the driving signal provided to each of plurality of loudspeakers differs by an exponentially increasing time-delay;

wherein the driving signal provided to each of the plurality of loudspeakers is derived from different digital audio files stored in a memory.

18. The one or more processor-readable storage devices of claim 17, wherein the loudspeakers are arranged such that the spacing between two adjacent loudspeakers increases exponentially along the array.

19. The one or more processor-readable storage devices of claim 17, wherein the loudspeakers are arranged such that the spacing between any pair of loudspeakers differs from the spacing between a different pair of loudspeakers.

20. The one or more processor-readable storage devices of claim 17, wherein the loudspeakers comprise dipole transmitters.

21. The one or more processor-readable storage devices of claim 17, wherein the driving signal provided to each of the plurality of loudspeakers is derived from a single digital audio file stored in a memory.

22. A system for the directional transmission of sound, the system comprising:

means for generating an audio signal; and means for providing a driving signal to each of plurality of loudspeakers, based at least in part on the audio signal, wherein the driving signal provided to each of plurality of loudspeakers differs by an exponentially increasing time-delay;

wherein the driving signal provided to each of the plurality of loudspeakers is derived from different digital audio files stored in a memory.

23. The system of claim 22, wherein the loudspeakers are arranged such that the spacing between two adjacent loudspeakers increases exponentially along the array.

24. The system of claim 22, wherein the loudspeakers are arranged such that the spacing between any pair of loudspeakers differs from the spacing between a different pair of loudspeakers.

25. The system of claim 22, wherein the loudspeakers comprise dipole transmitters.

26. The system of claim 22, wherein the driving signal provided to each of the plurality of loudspeakers is derived from a single digital audio file stored in a memory.

27. The system of claim 22, wherein the means for generating comprises a storage configured to store a digital audio file and a digital-to-analog converter configured to convert the digital audio file into an audio signal.

28. A system for the directional transmission of sound, the system comprising:

an audio source configured to generate an audio signal;

a control module configured to receive the audio signal and generate a driving signal, based at least in part on the audio signal; and a line array comprising a plurality of directional loudspeakers, wherein, in response to the driving signal, each loudspeaker is configured to produce sound primarily in the direction of the line array, and wherein the loudspeakers are arranged such that the spacing between two adjacent loudspeakers increases along the line array;

wherein the driving signal for each loudspeaker differs by a time-delay, and wherein the time-delay for a given loudspeaker is the distance between a first loudspeaker and the given loudspeaker divided by the speed of sound, and wherein the driving signal provided to each of the plurality of loudspeakers is derived from different digital audio files stored in a memory.

29. The system of claim 28, wherein the loudspeakers are arranged such that the spacing between two adjacent loudspeakers increases exponentially along the array.

30. The system of claim 28, wherein the loudspeakers are arranged such that the spacing between any pair of loudspeakers differs from the spacing between a different pair of loudspeakers.

31. The system of claim 28, wherein the loudspeakers comprise dipole transmitters.

32. The system of claim 28, wherein the driving signal is different for each of the loudspeakers.

* * * * *